United States Patent
Zhang

(10) Patent No.: US 12,238,719 B2
(45) Date of Patent: Feb. 25, 2025

(54) INFORMATION TRANSMISSION METHOD AND APPARATUS

(71) Applicant: HUAWEI TECHNOLOGIES CO., LTD., Shenzhen (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 17/704,549

(22) Filed: Mar. 25, 2022

(65) Prior Publication Data
US 2022/0217702 A1    Jul. 7, 2022

Related U.S. Application Data

(63) Continuation of application No. PCT/CN2019/108320, filed on Sep. 26, 2019.

(51) Int. Cl.
*H04W 72/20* (2023.01)
*H04L 5/00* (2006.01)
*H04W 4/40* (2018.01)

(52) U.S. Cl.
CPC ........... *H04W 72/20* (2023.01); *H04L 5/0094* (2013.01); *H04W 4/40* (2018.02)

(58) Field of Classification Search
CPC ....... H04W 72/20; H04W 4/40; H04W 72/00; H04L 5/0094; H04L 5/0053
See application file for complete search history.

(56) References Cited

U.S. PATENT DOCUMENTS

| | | | |
|---|---|---|---|
| 11,516,692 B2* | 11/2022 | Lee | H04W 28/021 |
| 11,540,097 B2* | 12/2022 | Park | H04B 7/15592 |
| 2019/0363843 A1* | 11/2019 | Gordaychik | H04L 1/08 |

(Continued)

FOREIGN PATENT DOCUMENTS

| | | |
|---|---|---|
| CN | 105451211 A | 3/2016 |
| CN | 110100496 A | 8/2019 |
| WO | 2018039079 A1 | 3/2018 |

OTHER PUBLICATIONS

Futurewei, Two-stage SCI design and adaptive DMRS supportfor sidelink 3GPP TSG RAN WGI Meeting #98, R1-1908737, 2019, 6 pages.

(Continued)

*Primary Examiner* — Habte Mered
(74) *Attorney, Agent, or Firm* — HAUPTMAN HAM, LLP

(57) ABSTRACT

An information transmission method and a communication apparatus that is applied to a communication system, for example, V2X, LTE-V, MTC, IoT, LTE-M, and M2M, to perform information transmission between terminal devices in a contention-based scheduling mode. The method includes: a first terminal device sends first sidelink control information SCI to a second terminal device, where the first SCI includes information about a first subchannel set, the first subchannel set is an available subchannel set sensed by the first terminal device on a sidelink SL, and the first SCI does not include modulation and coding scheme MCS information. The first SCI does not include the MCS information. This can both reduce signaling overheads of the first terminal device, and improve efficiency of demodulating the first SCI by the second terminal device.

20 Claims, 9 Drawing Sheets

(56) References Cited

U.S. PATENT DOCUMENTS

2020/0314804 A1* 10/2020 Shin .................. H04L 5/0055
2021/0067290 A1*  3/2021 Chen ................. H04L 5/0033
2022/0272727 A1*  8/2022 Salim ................ H04L 5/0051

OTHER PUBLICATIONS

OPPO: "Support of mode 2a resource allocation for NR-V2X", 3GPP Draft; R1-1904922, Apr. 8, 2019-Apr. 12, 2019, XP051707343, 8 pages.
Ericsson, PHY layer structure for NR sidelink 3GPP TSG RANWGI Meeting #98, R1-1908911, 2019, 18 pages.
Nokia et al.: "Discussion of physical layer structure for sidelink", 3GPP Draft; R1-1906074, 2019, XP051708116, 18 pages.
KYOCERA: "Sidelink Physical Layer Structure", EPO Form 1703 01.91 TRI3GPP Draft; R1-1909015, XP051765619, 2019, 7 pages.
International Search Report issued in corresponding International Application No. PCT/CN2019/108320, dated Jun. 28, 2020, pp. 1-9.
Extended European Search Report issued in corresponding European Application No. 19947198.8, dated Jul. 11, 2022, pp. 1-11.

* cited by examiner

INFORMATION TRANSMISSION METHOD AND APPARATUS

CROSS-REFERENCE TO RELATED APPLICATIONS

This application is a continuation of International Application No. PCT/CN2019/108320, filed on Sep. 26, 2019, the disclosures of which is hereby incorporated by reference in its entirety.

BACKGROUND

In a network of a long term evolution (long term evolution, LTE) technology proposed in the 3rd generation partnership project (the 3rd generation partnership project, 3GPP), an Internet of vehicles technology for vehicle-to-everything (vehicle-to-everything, V2X) communication is proposed. The V2X communication is communication between a vehicle and everything outside the vehicle, and includes vehicle-to-vehicle (vehicle-to-vehicle, V2V) communication, vehicle-to-pedestrian (vehicle-to-pedestrian, V2P) communication, vehicle-to-infrastructure (vehicle-to-infrastructure, V2I) communication, and vehicle-to-network (vehicle-to-network, V2N) communication.

With development of a V2X communication technology, more and more terminal devices use the V2X communication technology for communication. For example, during a resource scheduling process shown in FIG. 1, when performing resource transmission on a sidelink (sidelink, SL), a terminal device first performs resource sensing in a sensing window, and then select an idle resource in a selection window for resource transmission.

Therefore, a person skilled in the art works on a problem of how to perform information transmission when a terminal device interacts with a terminal device.

SUMMARY

Embodiments of this application provide an information transmission method and an apparatus, and is applied to a communication system, for example, vehicle-to-everything (vehicle-to-everything, V2X) communication, long term evolution-vehicle (long term evolution-vehicle, LTE-V), Internet of vehicles, machine type communication (machine type communication, MTC), Internet of things (internet of things, IoT), long term evolution-machine (long term evolution-machine, LTE-M), or machine-to-machine (machine-to-machine, M2M) communication, to resolve a problem of information transmission between terminal devices in a contention-based scheduling mode.

According to a first aspect, an embodiment of this application provides an information transmission method, including: a first terminal device sends first sidelink control information SCI to a second terminal device, where the first SCI includes information about a first subchannel set, the first subchannel set is an available subchannel set sensed by the first terminal device on a sidelink SL, and the first SCI does not include modulation and coding scheme (modulation and coding scheme, MCS) information.

In this embodiment of this application, the first SCI does not include the MCS information. This both reduces signaling overheads of the first terminal device, and improves efficiency of demodulating the first SCI by the second terminal device.

In a possible implementation, the first SCI includes a first field and a second field: the first field is used to indicate transmit end information of data transmitted on the SL, or the first field is a format identifier of the first SCI; and the second field is used to indicate priority information of the data.

In a possible implementation, the method further includes: the first terminal device receives second SCI sent by the second terminal device, where the second SCI includes information about a second subchannel set, the second subchannel set is an available subchannel set sensed by the second terminal device on the SL, and the second SCI does not include MCS information.

In a possible implementation, a payload of the second SCI is the same as a payload of the first SCI.

In a possible implementation, the second SCI includes a third field and a fourth field; the third field is used to indicate receive end information of the data transmitted on the SL, or the third field is a format identifier of the second SCI; and the fourth field is used to indicate at least one of channel state information CSI, feedback information, or a reserved bit.

In a possible implementation, a format of the first SCI and a format of the second SCI are configured by using same higher layer signaling.

In this embodiment of this application, the payload (payload) of the first SCI is the same as the payload of the second SCI, and the first SCI and the second SCI are configured by using the same higher layer signaling. This avoids separately configuring two pieces of SCI by using two pieces of signaling, and reduces signaling overheads.

In a possible implementation, the method further includes: the first terminal device determines a target subchannel set based on the first subchannel set and the second subchannel set; and sends the data to the second terminal device by using the target subchannel set.

In this embodiment of this application, the first terminal device sends the information about the first subchannel set to the second terminal device, and the second terminal device sends the information about the second subchannel set to the first terminal device, so that the first terminal device and the second terminal device clearly learns of the available subchannel set sensed by each other. Therefore, the terminal device learns more of the available subchannel set sensed by the other, further determines the target subchannel set more accurately, and improves efficiency of determining the target subchannel set.

In a possible implementation, the target subchannel set is an intersection between the first subchannel set and the second subchannel set.

In this embodiment of this application, the target subchannel set is an intersection between the first subchannel set and the second subchannel set. In other words, both the first terminal device and the second terminal device transmits data information and/or control information by using the target subchannel set. This avoids a case in which the first terminal device or the second terminal device is unable to receive the data information and/or the control information, and improves reliability of information transmission.

In a possible implementation, the method further includes: the first terminal device sends third SCI to the second terminal device, where the third SCI includes scheduling information of the data transmitted on the SL.

In a possible implementation, the third SCI further includes information used to indicate a feedback subchannel set, and the feedback subchannel set is at least included in the first subchannel set.

According to a second aspect, an embodiment of this application provides an information transmission method, including: before sensing whether a subchannel set is available, determining a scheduling mode, where the scheduling mode includes a first mode or a second mode: sensing an available subchannel set; and when the scheduling mode is the first mode, sensing the available subchannel set by using a first threshold: or when the scheduling mode is the second mode, sensing the available subchannel set by using a second threshold, where the first threshold is less than the second threshold.

In this embodiment of this application, sensing, in the first mode, is performed by a terminal device, and the terminal device reports the available subchannel set to a network device. Therefore, a parameter of an energy threshold of the available subchannel set reported in the first mode is stricter, to ensure that data transmitted by using the reported available subchannel set does not collide. Sensing, in the second mode, is performed by both a terminal device 1 and a terminal device 2. Therefore, an energy threshold of the available subchannel set is larger. This ensures that the terminal device uses the available subchannel set, avoid collision, and improve resource utilization.

In a possible implementation, the first threshold and the second threshold are predetermined, or the first threshold and the second threshold are configured by the network device by using signaling.

According to a third aspect, an embodiment of this application provides an information transmission method, including: a second terminal device receives first SCI sent by a first terminal device, where the first SCI includes information about a first subchannel set, the first subchannel set is an available subchannel set sensed by the first terminal device on a sidelink SL, and the first SCI does not include modulation and coding scheme MCS information; and sends second SCI to the first terminal device, where the second SCI includes information about a second subchannel set, the second subchannel set is an available subchannel set sensed by the second terminal device on the SL, and the second SCI does not include MCS information.

In a possible implementation, the first SCI includes a first field and a second field: the first field is used to indicate transmit end information of data transmitted on the SL, the first field is a format identifier of the first SCI, or the first field is indication information of a reference signal for measurement on the SL; and the second field is used to indicate priority information of the data. In a possible implementation, the second SCI includes a third field and a fourth field:

the third field is used to indicate receive end information of the data transmitted on the SL, or the third field is a format identifier of the second SCI; and the fourth field is used to indicate at least one of channel state information CSI, feedback information, or a reserved bit.

In a possible implementation, a payload of the second SCI is the same as a payload of the first SCI.

In a possible implementation, a format of the first SCI and a format of the second SCI are configured by using same higher layer signaling.

In a possible implementation, the method further includes: the second terminal device receives the data sent by the first terminal device by using a target subchannel set, where the target subchannel set is an intersection between the first subchannel set and the second subchannel set.

In a possible implementation, the method further includes: the second terminal device receives third SCI sent by the first terminal device, where the third SCI includes scheduling information of the data transmitted on the SL.

In a possible implementation, the third SCI further includes information used to indicate a feedback subchannel set, and the feedback subchannel set is at least included in the first subchannel set.

According to a fourth aspect, an embodiment of this application provides a communication apparatus. The communication apparatus is a first terminal device, and includes a processing unit, a receiving unit, and a sending unit. The processing unit is configured to perform the corresponding method in the first aspect or the second aspect, the receiving unit is configured to perform the corresponding method in the first aspect or the second aspect, and the sending unit is configured to perform the corresponding method in the first aspect or the second aspect.

According to a fifth aspect, an embodiment of this application provides a communication apparatus. The communication apparatus is a second terminal device, and includes a receiving unit and a sending unit. The receiving unit is configured to perform the corresponding method in the third aspect, and the sending unit is configured to perform the corresponding method in the third aspect.

In a possible implementation, the communication apparatus further includes a processing unit. For example, the processing unit is configured to sense a second subchannel set.

The second terminal device further is configured to perform the method in the second aspect. For example, the processing unit is configured to perform the corresponding method in the second aspect.

According to a sixth aspect, an embodiment of this application provides a communication apparatus, including a processor and a memory. The memory is configured to store computer-executable instructions, and the processor is configured to execute the computer-executable instructions stored in the memory, to enable the communication apparatus to perform the corresponding method in the first aspect or the second aspect.

According to a seventh aspect, an embodiment of this application provides a communication apparatus, including a processor and an interface circuit. The interface circuit is configured to receive code instructions and transmit the code instructions to the processor, and the processor runs the code instructions, to perform the corresponding method in the first aspect or the second aspect.

According to an eighth aspect, an embodiment of this application provides a communication apparatus, including a processor and a memory. The memory is configured to store computer-executable instructions, and the processor is configured to execute the computer-executable instructions stored in the memory, to enable the communication apparatus to perform the corresponding method in the third aspect.

According to a ninth aspect, an embodiment of this application provides a communication apparatus, including a processor and an interface circuit. The interface circuit is configured to receive code instructions and transmit the code instructions to the processor, and the processor runs the code instructions, to perform the corresponding method in the third aspect.

According to a tenth aspect, an embodiment of this application provides a communication system, including a first terminal device and a second terminal device. The first terminal device is configured to perform the method in the first aspect, and the second terminal device is configured to perform the method in the third aspect.

In a possible implementation, the first terminal device alternatively is configured to perform the method in the second aspect, and the second terminal device alternatively is configured to perform the method in the second aspect.

According to an eleventh aspect, an embodiment of this application provides a readable storage medium. The readable storage medium is configured to store instructions, and when the instructions are executed, the method in the first aspect or the second aspect is implemented.

In a possible implementation, the readable storage medium includes a computer-readable storage medium.

According to a twelfth aspect, an embodiment of this application provides a readable storage medium. The readable storage medium is configured to store instructions, and when the instructions are executed, the method in the third aspect is implemented.

In a possible implementation, the readable storage medium includes a computer-readable storage medium.

According to a thirteenth aspect, an embodiment of this application provides a computer program product including instructions. When the instructions are executed, the method in the first aspect or the second aspect is implemented.

According to a fourteenth aspect, an embodiment of this application provides a computer program product including instructions. When the instructions are executed, the method in the third aspect is implemented.

DESCRIPTION OF EMBODIMENTS

The following describes embodiments of this application with reference to the accompanying drawings in embodiments of this application.

In the specification, claims, and accompanying drawings of this application, the terms "first", "second", and so on are intended to distinguish between different objects but do not indicate a particular order. In addition, the terms "including", "having", and any other variant thereof are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

In this application, "at least one (item)" means one or more, "a plurality of" means two or more, and "at least two (items)" means two, three, or more. The term "and/or" is used to describe an association relationship between associated objects, and indicates that three relationships exists. For example, "A and/or B" indicates the following three cases: A exists, B exists, and both A and B exist, where A and B is singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c represents: a, b, c, a and b, a and c, b and c, or a, b, and c, where a, b, and c is singular or plural.

Figure 2:
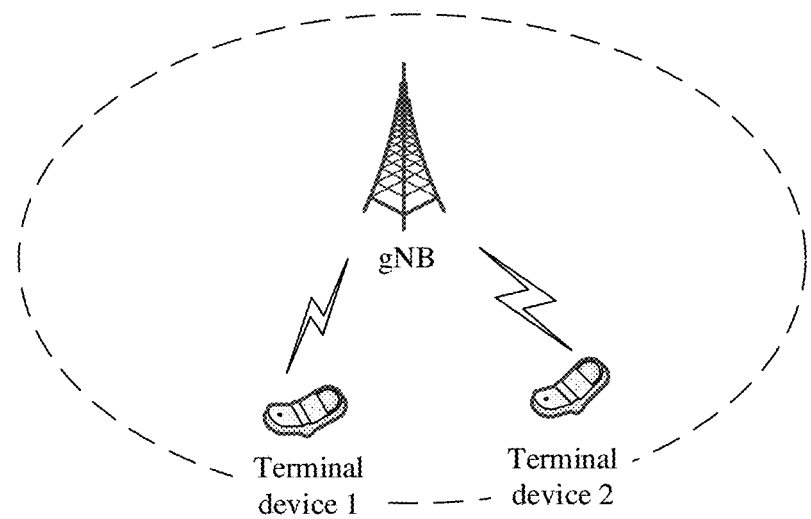
FIG. 2 is a schematic diagram of a communication system according to an embodiment of this application.

A communication system used in this application is understood as a wireless cellular communication system, or is understood as a wireless communication system based on a cellular network architecture, for example, a 5th generation (5th generation, 5G) mobile communication system and a next generation mobile communication system. FIG. 2 is a schematic diagram of a communication system according to an embodiment of this application. The solutions in this application are applicable to the communication system. The communication system includes at least one network device, and one network device is shown, for example, a next generation NodeB (the next generation NodeB, gNB) in the figure. The communication system further includes one or more terminal devices connected to the network device, for example, a terminal device 1 and a terminal device 2 in the figure.

The network device is a device that communicates with the terminal device. The network device is any device that has a wireless transceiver function, and includes but is not limited to a base station. For example, the base station is a gNB, or a base station in a future communication system. Optionally, the network device alternatively is an access node, a wireless relay node, a wireless backhaul node, or the like in a wireless local area network (wireless fidelity, Wi-Fi) system. Optionally, the network device alternatively is a radio controller in a cloud radio access network (cloud radio access network, CRAN) scenario. Optionally, the network device alternatively is a wearable device, a vehicle-mounted device, or the like. Optionally, the network device alternatively is a small station, a transmission node (transmission reference point, TRP), or the like. Certainly, this application is not limited thereto.

The terminal device further is referred to as user equipment (user equipment, UE), a terminal, or the like. The terminal device is a device having a wireless transceiver function. The terminal device is deployed on land, and includes an indoor device, an outdoor device, a handheld device, a wearable device, or a vehicle-mounted device: or is deployed on a water surface, for example, on a ship: or is deployed in the air, for example, on an airplane, a balloon, or a satellite. The terminal device is a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

In the communication system shown in FIG. 2, the terminal device 1 may alternatively communicate with the terminal device 2 by using a device-to-device (device-to-device, D2D) technology or a vehicle-to-everything (vehicle-to-everything, V2X) communication technology.

Figure 1:
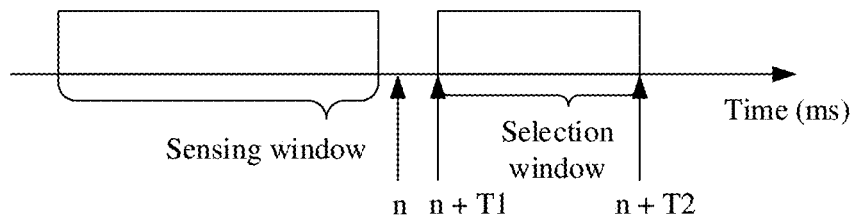
FIG. 1 is a schematic flowchart of a resource scheduling process according to an embodiment of this application.

The communication system in FIG. 1 is applied to a communication scenario in another embodiment of this application. Details are undescribed herein. For example, the terminal device 1 and the terminal device 2 is configured to perform an information transmission method embodiment shown in FIG. 6 or FIG. 10a.

The following uses the terminal device 1 and the terminal device 2 in NR-V2X as an example to describe a communication scenario of a corresponding information transmission method provided in embodiments of this application.

FIG. 3a to FIG. 3g are schematic diagrams of sidelink (sidelink) (which further is referred to as a direct link) communication scenarios according to embodiments of this application.

Figure 3A:
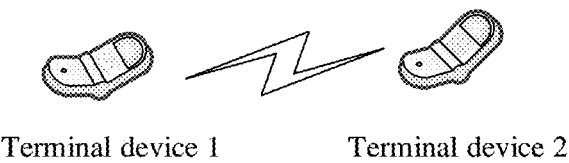
FIG. 3a is a schematic diagram of a sidelink communication scenario according to an embodiment of this application.

In the scenario shown in FIG. 3a, both the terminal device 1 and the terminal device 2 are outside a coverage area of a cell.

Figure 3B:
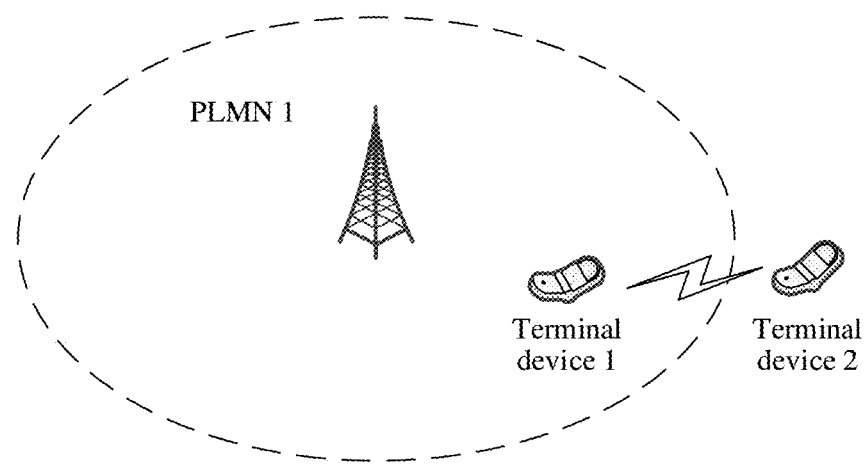
FIG. 3b is a schematic diagram of a sidelink communication scenario according to an embodiment of this application.

In the scenario shown in FIG. 3b, the terminal device 1 is in a coverage area of a cell, and the terminal device 2 is outside the coverage area of the cell.

Figure 3C:
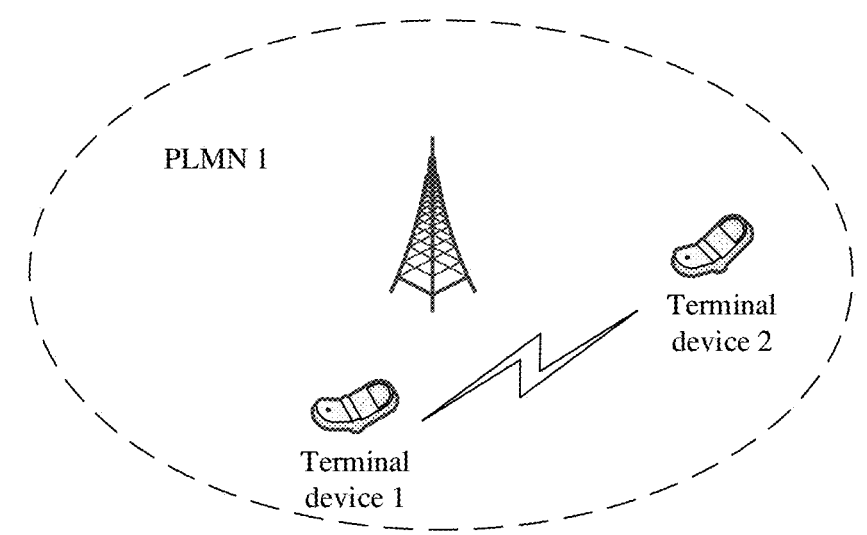
FIG. 3c is a schematic diagram of a sidelink communication scenario according to an embodiment of this application.

In the scenario shown in FIG. 3c, both the terminal device 1 and the terminal device 2 are in a coverage area of a same cell, and in a same public land mobile network (public land mobile network, PLMN), for example, a PLMN 1.

Figure 3D:
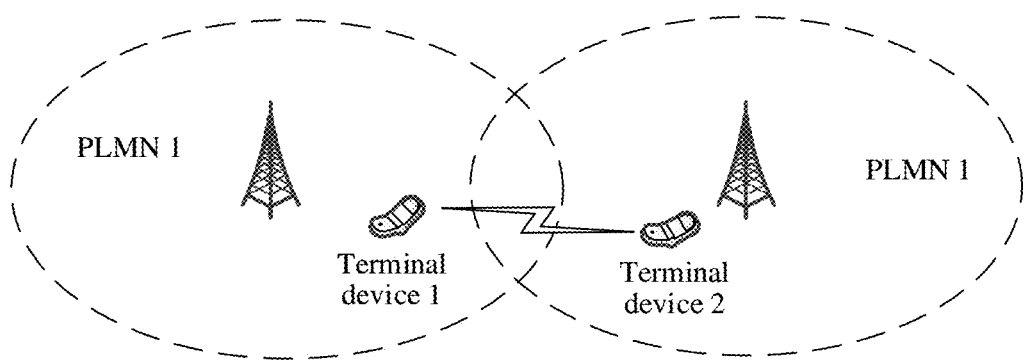
FIG. 3d is a schematic diagram of a sidelink communication scenario according to an embodiment of this application.

In the scenario shown in FIG. 3d, both the terminal device 1 and the terminal device 2 are in a same PLMN, for example, a PLMN 1, but in coverage areas of different cells.

Figure 3E:
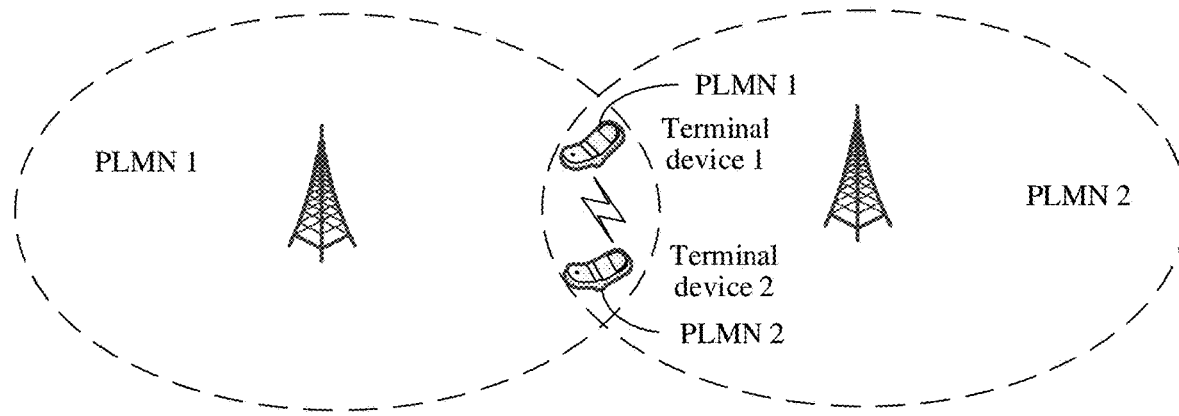
FIG. 3e is a schematic diagram of a sidelink communication scenario according to an embodiment of this application.

In the scenario shown in FIG. 3e, the terminal device 1 and the terminal device 2 are in different PLMNs and different cells, and the terminal device 1 and the terminal device 2 are in a common coverage area of two cells. For example, the terminal device 1 is in a PLMN 1, and the terminal device 2 is in a PLMN 2.

Figure 3F:
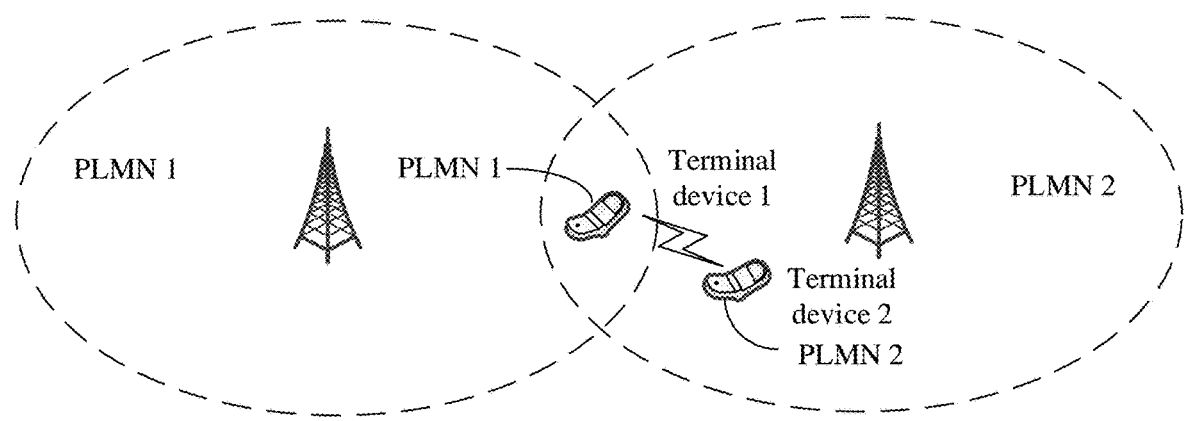
FIG. 3f is a schematic diagram of a sidelink communication scenario according to an embodiment of this application.

In the scenario shown in FIG. 3f, the terminal device 1 and the terminal device 2 are in different PLMNs and different cells, the terminal device 1 is in a common coverage area of two cells, and the terminal device 2 is in a coverage area of a serving cell.

Figure 3G:
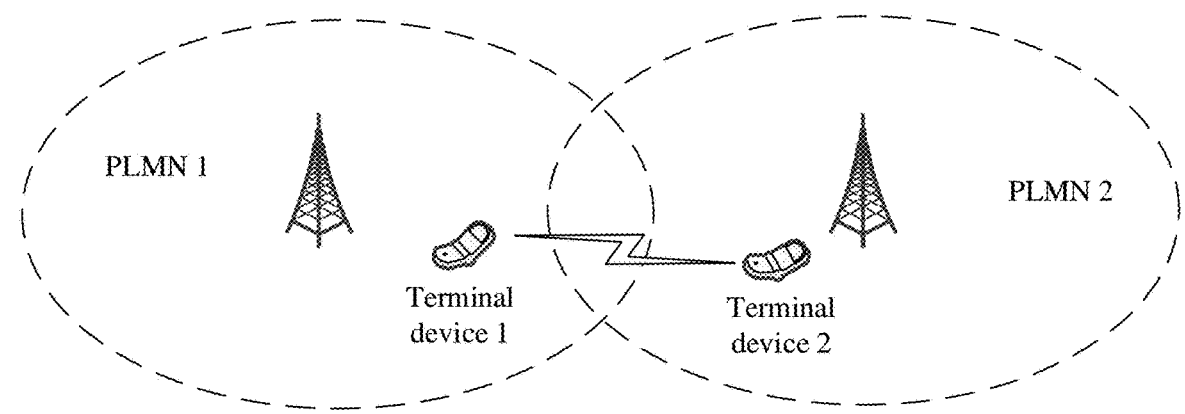
FIG. 3g is a schematic diagram of a sidelink communication scenario according to an embodiment of this application.

In the scenario shown in FIG. 3g, the terminal device 1 and the terminal device 2 are in different PLMNs and different cells, and the terminal device 1 and the terminal device 2 are in coverage areas of respective serving cells.

The foregoing scenarios are applicable to vehicle-to-everything (vehicle-to-everything, V2X), which further is referred to as V2X. For an application scenario, for example, the D2D technology is applied to a neighborhood-based social application. For example, data between adjacent terminal devices is transmitted by using the D2D technology, for example, content sharing and interactive games. The D2D technology may further resolve communication interruption, in a rescue, caused by a natural disaster. For example, in the rescue scenario, wireless communication is established between two adjacent terminal devices by using the D2D technology. For another example, information such as a commodity discount promotion, a movie preview, and the like is pushed to a user by using the D2D technology. A scenario to which the D2D technology is applied is uniquely unlimited in this embodiment of this application.

Figure 4:
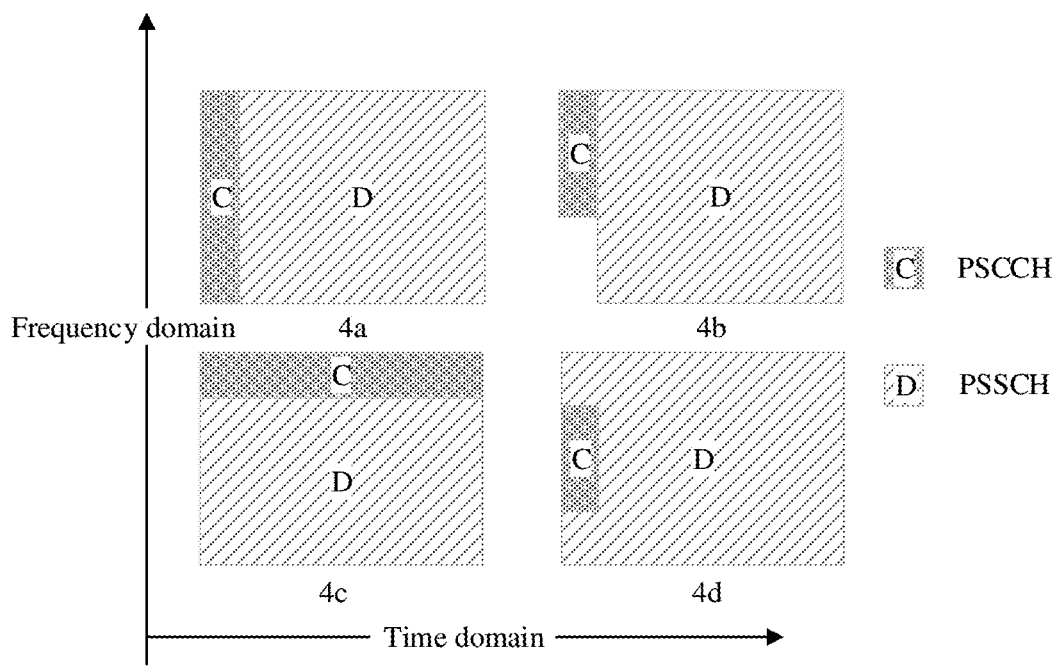
FIG. 4 is a schematic diagram of a frame structure according to an embodiment of this application.

FIG. 4 is a schematic diagram of a frame structure according to an embodiment of this application. In N2R, frame structures is classified into four types, respectively shown in 4a to 4d in FIG. 4. A sidelink data channel such as a physical sidelink shared channel (physical sidelink shared channel, PSSCH) and a sidelink control channel such as a physical sidelink control channel (physical sidelink control channel, PSCCH) overlap in time domain but do not overlap in frequency domain, overlap in frequency domain but do not overlap in time domain, and overlap in time domain and frequency domain.

For example, in V2X communication (or in M2M communication, LTE-V communication, or the like), when a resource is transmitted on a sidelink (sidelink, SL), two modes are usually included, namely, a network device-based scheduling mode, which is usually referred to as a mode 1, and a contention-based scheduling mode, which is usually referred to as a mode 2. For example, in FIG. 1, in a scheduling process of the mode 2, the terminal device performs resource sensing in a sensing (sensing) window, and then select an idle resource in a selection window for resource transmission. Alternatively, the terminal device performs sensing on a resource by using listen before talk (listen before talk, LBT). When the LBT succeeds, a resource that is successfully sensed is used for resource transmission. When the LBT fails, an available resource is sensed again. In this case, an embodiment of this application provides an information transmission method, to further improve a contention-based resource scheduling process.

Before the information transmission method provided in embodiments of this application is described, the following describes terms in embodiments of this application in detail.

Listen before talk (listen before talk, LBT) is further referred to as listen before talk, and is a carrier sense multiple access (carrier sense multiple access, CSMA) technology. An LBT mechanism avoids a conflict when an unlicensed spectrum resource is used.

With a sharp increase of wireless data service volumes, a licensed spectrum is unable to meet a spectrum parameter of communication. Preemption of an unlicensed spectrum for information transmission improves a data throughput in a wireless communication network, and better meet a user prerequisites. Based on this, the 3rd generation partnership project (3rd generation partnership project, 3GPP) introduces licensed assisted access (license assisted access, LAA) and enhanced licensed assisted access (enhanced LAA, eLAA) technologies in release 13 (release 13) and release 14 (release 14) respectively. An LTE/LTE-A system is deployed on an unlicensed spectrum in a non-standalone manner, and usage of an unlicensed spectrum resource is maximized with assistance by a licensed spectrum.

Usually, a communication apparatus (including the foregoing network device and terminal device) in the communication system deployed on the unlicensed spectrum uses a radio resource in a contention-based manner. In other words, before sending a signal, the communication apparatus first listens whether the unlicensed spectrum is idle. For example, a busy/idle state of a channel is determined based on a value of received power on the unlicensed spectrum. If the received power is less than or equal to a threshold, the received power is considered that the channel in the unlicensed spectrum is in the idle state, and the signal is sent on the unlicensed spectrum: otherwise, the signal is unsent. The listen before send mechanism is called an LBT mechanism. In other words, to enable a plurality of unlicensed frequency band devices to fairly use unlicensed frequency band channels, and avoid mutual interference between the unlicensed frequency band devices, currently, the LBT mechanism is used to listen whether a channel is idle. When an unlicensed frequency band channel is occupied, that indicates the LBT fails, and a signal is unsent. When an unlicensed frequency band channel is idle, that indicates the LBT succeeds, and the communication apparatus sends a signal.

If the LBT succeeds, that indicates a sending device obtains an available channel through contention. Therefore, after the LBT succeeds, the sending device sends a channel occupancy signal to another peripheral device. The channel occupancy signal is referred to as a channel reservation (reservation) signal or a channel utilization (utilization) signal in different embodiments. The channel occupancy signal is used to indicate, to another device, transmission duration, namely, channel occupancy duration that is occupied by the sending device on the channel obtained through contention, to avoid collision caused because another device transmits data on the channel. This improves communication reliability and communication efficiency. The sending device is the foregoing communication apparatus that performs the LBT, and is a terminal device. If a device that initiates an LBT procedure is a terminal device, the sending device is a terminal device.

The channel occupancy duration is measured in a unit of microseconds (µs), a unit of orthogonal frequency division multiplexing (orthogonal frequency division multiplexing, OFDM) symbols, a unit of slots (slot), a unit of mini-slots (mini-slot), or the like. A subcarrier spacing corresponding to the foregoing OFDM symbol or slot is a subcarrier spacing predetermined in a standard, or is the same as a subcarrier spacing of the channel occupancy signal.

The following describes sidelink control information (sidelink control information, SCI) in embodiments of this application.

In the D2D/V2X technology, SCI includes a modulation and coding scheme (modulation and coding scheme, MCS), data scheduling information, and the like. In embodiments of this application, the SCI in this format is referred to as SCIB (third SCI).

However, embodiments of this application provide SCI in another format. For example, the SCI in another format is referred to as SCIA, and the SCIA further is classified into SCIA 1 (first SCI) and SCIA 2 (second SCI). The following describes the SCIA by using the first SCI and the second SCI as an example.

Figure 5:
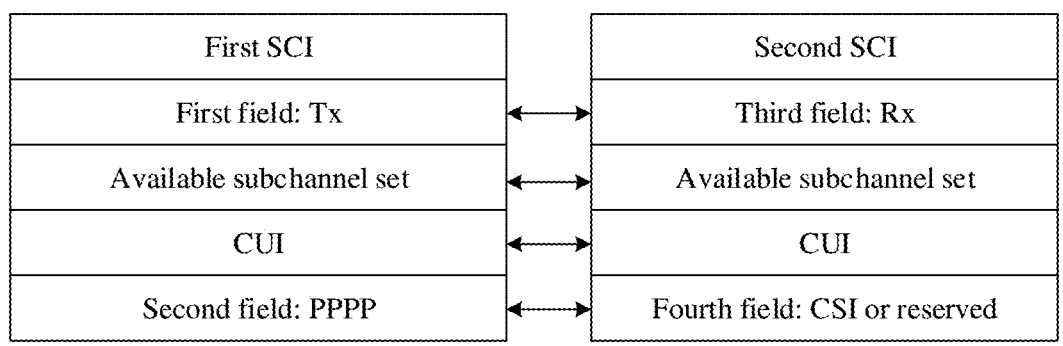
FIG. 5 is a schematic diagram of a structure of first SCI and a structure of second SCI according to an embodiment of this application.

FIG. 5 shows content carried in the first SCI and the second SCI respectively. A payload (payload) of the first SCI is the same as a payload of the second SCI. In addition, a format of the first SCI and/or a format of the second SCI are configured by same higher layer signaling. In other words, a location of a field in the first SCI, or a location and a meaning of a field in the first SCI are configured for the terminal device by using the higher layer signaling. A location of a field in the second SCI, or a location and a meaning of a field in the second SCI are configured for the terminal device by using the higher layer signaling. The location of the field in the first SCI and the location of the field in the second SCI, or the location and the meaning of the field in the first SCI and the location and the meaning of the field in the second SCI are configured for the terminal device by using the same higher layer signaling. In other words, a location of each field configured by the higher layer signaling, or a location and a meaning of each field configured by the higher layer signaling are applicable to both the first SCI and the second SCI.

As shown in FIG. 5, a first field is used to indicate transmit end information of data transmitted on an SL, and a third field is used to indicate receive end information of the data transmitted on the SL. The data is data sent by the terminal device 1 to the terminal device 2. The terminal device 1 is a data transmit end, and the terminal device 2 is a data receive end. In other words, the first field and the third field are used to indicate a transmission direction of the data. Alternatively, the first field indicates transmit end information of the data, and the third field indicates receive end information of the data. The transmit end information of the data is understood as that a transmit end of the data transmitted on a PSSCH from the terminal device 1 to the terminal device 2 is the terminal device 1. The receive end information of the data is understood as that a receive end of the data transmitted on the PSSCH from the terminal device 1 to the terminal device 2 is the terminal device 2. For example, the first field and the third field each is one bit. For example, 1 or 0 is used to respectively identify a transmit (transmission, Tx) terminal device such as the terminal device 1 and a receive (reception, Rx) terminal device such as the terminal device 2. For example, when the first field is 1, that indicates that the transmit terminal device is the terminal device 1. In this case, the third field is 0, and that indicates that the receive terminal device is the terminal device 2. An indication manner of the first field and the third field alternatively is another manner. For example, the first field and the third field each is two bits, and 11 or 00 is used to respectively indicate a transmit terminal device and a receive terminal device. The foregoing examples are not limited in this embodiment of this application. In this embodiment of this application, a first field of the first SCI and a third field of the second SCI are used as an example.

The third field of the second SCI alternatively is replaced with a first field of the second SCI.

Optionally, the first field and the third field alternatively is a format identifier of the first SCI and a format identifier of the second SCI respectively. For example, the format identifier of the first field is A1, and indicates that the first SCI is from the transmit end of the data. The format identifier of the third field is A2, and indicates that the second SCI is from the receive end of the data (the receive end is relative to the transmit end of the data). This embodiment of this application uses format identifiers A1 and A2 as an example. The format identifier A1 alternatively is replaced with a format identifier X (or Tx), the format identifier A2 alternatively is replaced with a format identifier Y (or Rx), and the like. For example, X is an integer, and Y further is an integer. For example, X is a letter, and Y further is a letter. For example, X is a combination of an integer and a letter, and Y further is a combination of an integer and a letter.

Optionally, the first SCI and the second SCI each includes a field used to indicate information about an available subchannel set. The available subchannel set is an idle subchannel set sensed by the transmit terminal device or the receive terminal device, or the available subchannel set is an available subchannel set sensed by the transmit terminal device or the receive terminal device. In other words, a field of an available subchannel shown in FIG. 5 is used to carry the available subchannel set sensed by the transmit terminal device or the receive terminal device. For example, an available subchannel set determined by the transmit terminal device is a subchannel 1 to a subchannel 5 and a subchannel 7 to a subchannel 9. In this case, the subchannel 1 to the subchannel 5 and the subchannel 7 to the subchannel 9 is padded in fields corresponding to available subchannels. The subchannel 1 to the subchannel 5 and the subchannel 7 to the subchannel 9 are indexes of a plurality of subchannels included in the available subchannel set. For example, the available subchannel set is a set index indicator, a subchannel index indicator, or a bitmap.

In this embodiment of this application, N physical resource blocks (physical resource block, PRB) is grouped into one subchannel, and the N PRBs is continuous PRBs, discontinuous PRBs, or the like. This is not limited in this embodiment of this application. Herein, N is a positive integer. For example, N=12, and one physical subchannel is a time-frequency two-dimensional structure including 12 subcarriers and one slot, where one slot is 14 orthogonal frequency division multiplexing (orthogonal frequency division multiplexing, OFDM) symbols or 13 OFDM symbols. In addition, N is any positive integer, and is one slot, one mini-slot, or M symbols in time domain, where M is a positive integer greater than or equal to 1 and less than or equal to 14. For another example, N is any integer less than or equal to 12. The continuous PRBs is uninterrupted PRBs from a PRB (M) to a PRB (N), where M is less than N, and M and N are positive integers. During sidelink transmission, the available subchannels are used to transmit data information between the terminal device 1 and the terminal device 2, and/or the available subchannels are used to transmit control information, or the like.

A method for sensing whether a subchannel is available is as follows: For example, the terminal device senses, based on signal energy received on the subchannel or signal energy sensed/listened on the subchannel, whether the subchannel is available. The signal energy includes any one of a received signal strength indication (received signal strength indication, RSSI), reference signal received power (reference signal received power, RSRP), or a signal to interference plus noise ratio (signal to interference plus noise ratio, SINR). For example, when sensing the subchannel 1, the terminal device first interprets, from sensed control information sent by a surrounding terminal device, quality of service (quality of service. QoS) information included in the control information: compare QoS information of to-be-transmitted data of the terminal device and the sensed QoS information of to-be-transmitted data on the subchannel 1: determine a threshold based on the foregoing Qos information; and if signal energy received on the subchannel meets the corresponding threshold, determine that the subchannel 1 is available: otherwise, determine that the subchannel 1 is unavailable.

The QoS information included in the control information is QoS information of to-be-sent data of a surrounding terminal device. Meeting the corresponding threshold is understood as that the sensed signal energy is less than or equal to the threshold. The sensed signal energy is determined based on any one or more of the RSSI, the RSRP, or the SINR, or is determined based on signal strength of sensed SCI, signal strength of a sensed PSSCH, or the like. This is not limited in this embodiment of this application. That the signal energy received on the subchannel is the signal strength of the sensed PSSCH is: sensing the PSSCH that is obtained from the SCI and that uses the subchannel, to obtain the signal strength of the PSSCH that uses the subchannel. The QoS information in this application further is referred to as QoS level information, service priority information, or the like. A name of the QoS information is not limited in this embodiment of this application. The QoS information includes at least one of a ProSe per-packet priority (ProSe per-packet priority, PPPP), N quality indexes (quality index, QI), or another related parameter used to indicate QoS. The threshold is a threshold determined based on QoS information of a sensing terminal device and QoS information of a sensed terminal device, and the threshold is preconfigured, or configured by the network device for the terminal device by using RRC signaling.

In this embodiment of this application, sensing a subchannel, receiving a subchannel, or listening a subchannel is interchanged. Further, the foregoing method for sensing whether a subchannel is available further is applied to a subchannel set. For example, sensed signal energy of subchannels included in the subchannel set is averaged. In other words, a linear average value or a weighted average value of the sensed signal energy of the subchannels included in the subchannel set is considered as final sensed signal energy of the subchannel set. For example, when the subchannel set includes the subchannel 1, the subchannel 3, and the subchannel 5, sensed signal energy of the three subchannels is averaged, to obtain an average value.

Optionally, the first SCI and the second SCI further includes a field used to indicate a channel occupancy indicator (channel utilization indicator, CUI). The CUI is used to indicate duration in which the transmit terminal device or the receive terminal device is to occupy the available subchannel. Alternatively, the CUI indicates duration in which another terminal device reserves the available subchannel for the transmit terminal device or the receive terminal device. For example, the duration indicated by the CUI is any duration obtained through division based on a unit of a time domain resource. In this embodiment of this application, the unit of the time domain resource is a combination of any one or more of an orthogonal frequency division multiplexing (orthogonal frequency division multiplexing, OFDM) symbol, a mini-slot, or a slot (slot). For example, the CUI indicates 10 slots (slot), 5 slots, or the like. The CUI is a continuous time period, a discontinuous time period, or the like. This is not limited in this embodiment of this application.

The available subchannel set includes one or more subchannels. In other words, the first SCI includes information about one or more subchannels. This is not limited in this embodiment of this application. When the first SCI includes information about a plurality of subchannels, the plurality of subchannels are a plurality of continuous subchannels, a plurality of discontinuous subchannels, or the like. This is not limited in this embodiment of this application. The second SCI alternatively indicates information about one or more subchannels. Details are not described herein again.

When available subchannel sets separately sensed by the transmit terminal device and the receive terminal device have a common available subchannel set, the transmit terminal device transmits control information and/or data information by using the sensed common available subchannel set. Having a common available sub-channel set includes: the available subchannel set sensed by the transmit terminal device is the same as the available subchannel set sensed by the receive terminal device, or there is an overlapping (overlap) part (namely, an intersection) between the available subchannel set sensed by the transmit terminal device and the available subchannel set sensed by the receive terminal device. However, when the available subchannel sets separately sensed by the transmit terminal device and the receive terminal device are completely different, that is, there is no intersection between the available subchannel set sensed by the transmit terminal device and the available subchannel set sensed by the receive terminal device, the transmit terminal device transmits the control information and/or the data information by using the available subchannel set sensed by the receive terminal device.

Optionally, the first SCI and the second SCI further includes feature (feature) fields, namely, a second field and a fourth field. The feature field of the transmit terminal device, namely, the second field, is used to indicate priority information of the data. The first SCI indicates the priority information of the data. Therefore, when sensing the available subchannel included in the first SCI of the transmit terminal device, another terminal device determines, based on the priority information of the data, whether the available subchannel is preempted or whether to avoid using the available subchannel. The feature domain of the receive terminal device is used to indicate channel state information (channel state information, CSI). The CSI is understood as a channel state of a subchannel set sensed by the receive terminal device. The transmit terminal device learns, by using the CSI, a channel state when the receive terminal device receives information, so that the transmit terminal device uses a corresponding MCS or the like during scheduling and transmission of data information on a sidelink. Optionally, the feature domain of the receive terminal device is a reserved bit. For example, if the feature domain of the receive terminal device is not activated, that is, the receive terminal device is unable to feed back a channel state, the feature domain of the receive terminal device is a reserved bit. In this case, the receive terminal device indicates, by using radio resource control (radio resource control, RRC) signaling or dynamic signaling, that the CSI is not activated. Optionally, when the dynamic signaling is used to indicate that the CSI is not activated, the dynamic signaling is SCIB (third SCI), downlink control information (downlink control information, DCI), SCIA, or the like. This is not limited in this embodiment of this application.

Optionally, the first field is indication information of a reference signal for measurement on the SL. The indication information of the reference signal for measurement on the SL is an index of the reference signal for measuring the CSI on the SL, activation information of the reference signal for measuring the CSI on the SL, or activation information used to measure the CSI on the SL. The activation information further is referred to as enabling information. Optionally, the third field is CSI, and the fourth field is used to indicate a reserved bit (which is further referred to as a reserved field) or feedback information. In this application, the feedback information included in the second SCI is feedback information for the first SCI, that is, whether a feedback (ACK/NACK) of the first SCI is correctly received.

The foregoing SCIA does not include scheduling information such as an MCS. In this embodiment of this application, the MCS is a modulation and coding scheme (modulation and coding scheme). In this application, the MCS is used in a general sense, that is, in different control information, the MCS is different values.

Optionally, because the first SCI and the second SCI is free from an MCS, that is, the first SCI and the second SCI are different from the third SCI, a subchannel set (including one or more subchannels) used for transmitting the first SCI and the second SCI is to be located in search space. In other words, the subchannel set used by the transmit terminal device to send the first SCI is one or more subchannels in the search space. For example, the subchannel set in which a control channel element (control channel element, CCE)/control resource set (control resource set, CORSET) used by the transmit terminal device to send the first SCI is located is a subchannel set x in the search space, where the subchannel set x includes one or more subchannels.

A sequence of fields, domains, or information included in the first SCI and the second SCI is an example, and not to be construed as a limitation on this embodiment of this application.

Then, the following describes the information transmission method in embodiments of this application by using an example in which the transmit terminal device is the terminal device 1, the receive terminal device is the terminal device 2, the SCIA corresponding to the terminal device 1 is the first SCI, and the SCIA corresponding to the terminal device 2 is the second SCI. However, during actual application, the terminal device 1 interacts with the terminal device 2, a terminal device 3, a terminal device 4, and the like. The terminal device 2 interacts with the terminal device 1, the terminal device 3, the terminal device 4, a terminal device 5, and the like. Therefore, the following example is not to be construed as a limitation on this application.

Figure 6:
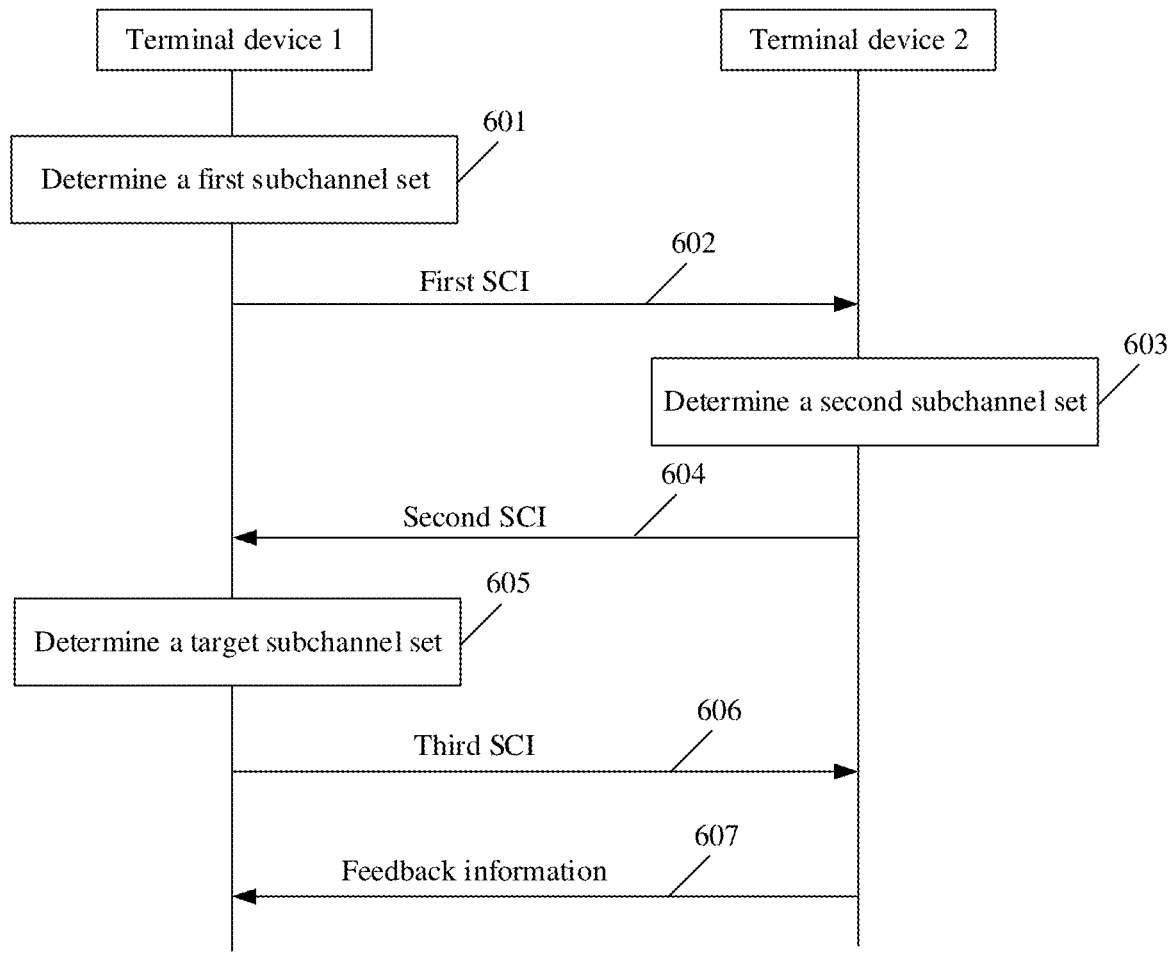
FIG. 6 is a schematic flowchart of an information transmission method according to an embodiment of this application.

FIG. 6 is a schematic diagram of a scenario of an information transmission method according to an embodiment of this application. The information transmission method includes the following steps.

601: A terminal device 1 senses and determines an available subchannel set. For example, the determined available subchannel set is referred to as a first subchannel set, and the first subchannel set includes one or more subchannels.

In this embodiment of this application, that the terminal device 1 senses an available subchannel further is referred to as that the terminal device 1 listens an available subchannel. For a method for sensing the available subchannel set by the terminal device 1, refer to the method for sensing the available subchannel or the available subchannel set by the transmit terminal device or the receive terminal device in the foregoing embodiments. Details are not described herein again.

602: The terminal device 1 sends first SCI to a terminal device 2.

The field used to indicate the information about the available subchannel set in the first SCI shown in FIG. 5 includes information about the first subchannel set. For example, the field includes an index (index) of the first subchannel set, where the index further is referred to as an identifier or the like. For another example, the field includes an index (index) forming subchannels of the first subchannel set, where the index further is referred to as an identifier or the like. For another example, the field includes a bitmap (bitmap) including subchannels, namely, a bitmap in which bits corresponding to the subchannels of the first subchannel set are marked as 1.

603: The terminal device 2 senses and determines an available subchannel set. For example, the determined available subchannel set is referred to as a second subchannel set, and the second subchannel set includes one or more subchannels.

The terminal device 2 senses and determine the available subchannel set after receiving the first SCI or before receiving the first SCI. In other words, step 603 is performed after step 601, before step 601, or the like. This is not limited in this embodiment of this application.

604: The terminal device 2 sends second SCI to the terminal device 1.

The field used to indicate the information about the available subchannel set in the second SCI shown in FIG. 5 includes information about the second subchannel set. In other words, the field used to indicate the available subchannel set in the second SCI indicates the second subchannel set.

For content of the first SCI and the second SCI, refer to the foregoing embodiments. The field used to indicate the information about the available subchannel set in the second SCI includes the information about the second subchannel set. For example, the field includes an index (index) of the second subchannel set, where the index further is referred to as an identifier or the like. For another example, the field includes an index (index) forming subchannels of the second subchannel set, where the index further is referred to as an identifier or the like. For another example, the field includes a bitmap (bitmap) including subchannels, namely, a bitmap in which bits corresponding to the subchannels of the second subchannel set are marked as 1.

Figure 7:
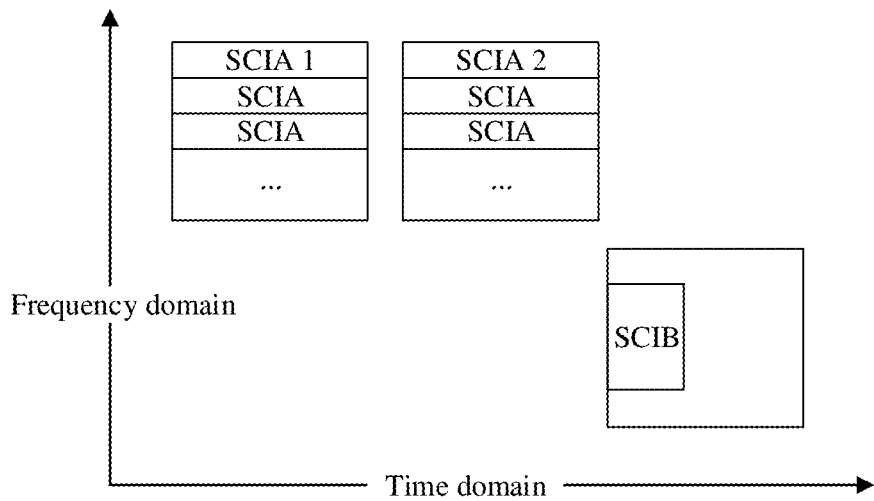
FIG. 7 is a schematic diagram of a method for sending first SCI according to an embodiment of this application.
Figure 8:
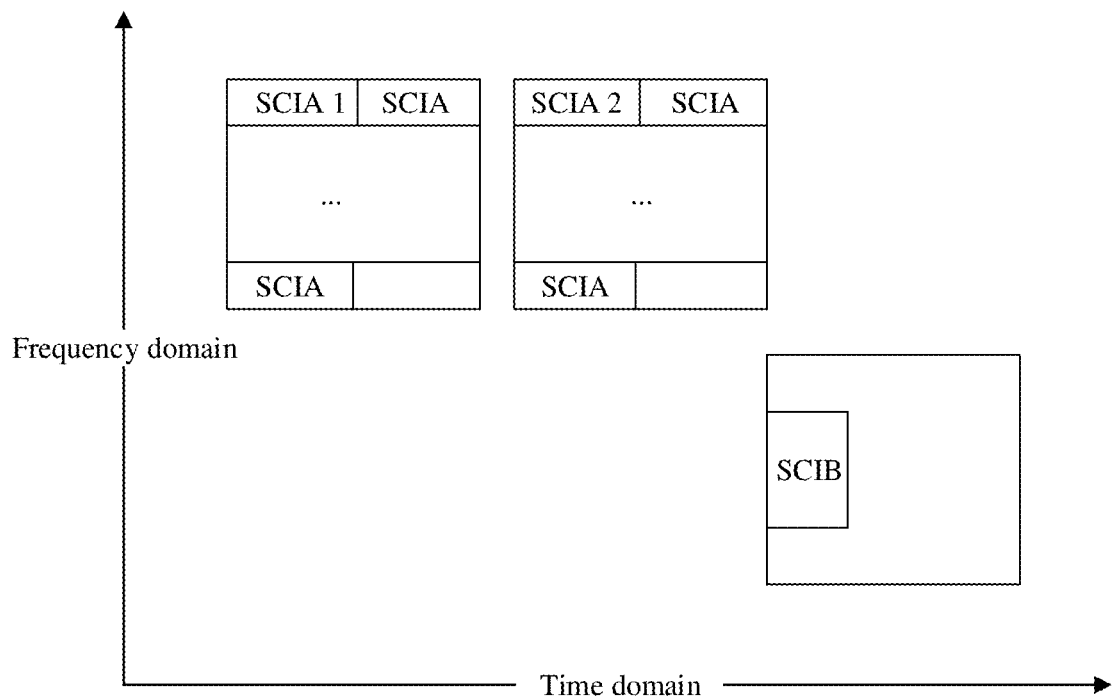
FIG. 8 is a schematic diagram of a method for sending first SCI according to an embodiment of this application.

Optionally, the first SCI and the second SCI is sent in search space by using examples shown in FIG. 7 and FIG. 8. As shown in FIG. 7, SCI occupies one slot (slot) in time domain and is arranged adjacent to each other sequentially. Alternatively, as shown in FIG. 8, SCI occupies several symbols, less than one slot, in time domain and is arranged adjacent to each other sequentially in time domain and frequency domain.

In this embodiment of this application, for data sent from the terminal device 1 to the terminal device 2, the first SCI and the second SCI have a sequence relationship in time domain. In other words, time at which the terminal device 1 sends the first SCI is earlier than time at which the terminal device 2 sends the second SCI. For different data service pairs or data service groups, the first SCI and the second SCI have no sequence relationship in time domain. In other words, if the terminal device 1 sends data to the terminal device 2, and a terminal device 3 sends data to a terminal device 4, the first SCI sent by the terminal device 1 and the second SCI sent by the terminal device 4 have no sequence relationship in time domain. In other words, time at which the terminal device 1 sends the first SCI is earlier than time at which the terminal device 4 sends the second SCI, time at which the terminal device 4 sends the second SCI is earlier than time at which the terminal device 1 sends the first SCI, or time at which the terminal device 4 sends the second SCI is the same as time at which the terminal device 1 sends the first SCI.

605: The terminal device 1 receives the second SCI from the terminal device 2, and determines a target subchannel set.

In this embodiment of this application, the target subchannel set is a subchannel set determined based on an intersection between the first subchannel set and the second subchannel set, or a subchannel set determined based on the second subchannel set. For description of the target subchannel set, refer to the foregoing embodiments. Details are not described herein again.

606: The terminal device 1 sends third SCI to the terminal device 2 by using the target subchannel set, and sends sidelink data to the terminal device 2.

Figure 9:
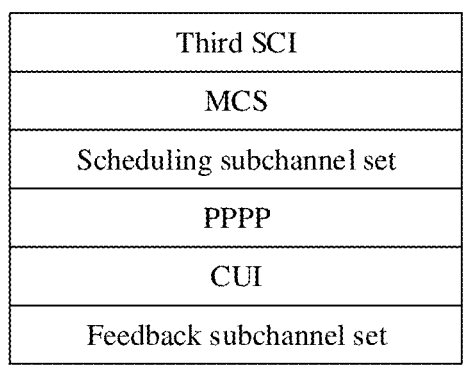
FIG. 9 is a schematic diagram of a structure of third SCI according to an embodiment of this application.

FIG. 9 is a schematic diagram of a format of the third SCI according to an embodiment of this application. The third SCI includes a combination of at least one or more of an MCS, a scheduling subchannel set (including one or more subchannels), a PPPP, and a CUI, and further includes indication information for a feedback resource. The scheduling subchannel set is understood as a subchannel set used to schedule data, and the indication information for the feedback resource is understood as a resource used to transmit feedback information. The resource used to transmit the feedback information is subchannel set information (which is referred to as a feedback subchannel set) used to transmit the feedback information, or physical resource block (physical resource block, PRB)/resource element (resource element, RE) information used to transmit the feedback information. For example, the subchannel set information used to transmit the feedback information is indicated by a subchannel (which is referred to as a feedback subchannel) used to transmit the feedback information, or is identified by an offset relative to a subchannel used to transmit data information. For example, the PRB/RE information is indicated as a PRB/RE index in a subchannel. Alternatively, the PRB/RE information is indicated as a PRB/RE index. In this embodiment of this application, the PPPP is an example, and the PPPP alternatively is replaced with any QoS information. For example, the QoS information alternatively is a QoS index, for example, N QoS indexes (N QI), where N is a positive integer.

Optionally, the feedback subchannel set is a subchannel set determined based on the intersection between the first subchannel set and the second subchannel set, or a subchannel set determined based on the first subchannel set. In other words, the feedback subchannel set is at least included in the first subchannel set. After receiving the data on the SL, the terminal device 2 feeds back whether the data is correctly received. Therefore, the feedback information is fed back by using the feedback subchannel set. Further, to enable the terminal device 1 to receive the feedback information, the feedback subchannel set is at least included in the first subchannel set.

In this application, the feedback information is HARQ information on the sidelink, namely, SLACK/NACK information. The HARQ information on the sidelink is usually carried on a physical sidelink feedback channel (physical sidelink feedback channel, PSFCH).

607: The terminal device 2 receives the third SCI from the terminal device 1, and sends physical sidelink feedback information to the terminal device 1.

In this embodiment of this application, the PSFCH is transmitted to the terminal device 1 based on the resource, indicated by the third SCI, used to transmit the feedback information.

If there is a prerequisite of a sending moment for sending SCI, or there is a prerequisite of aligning a slot boundary for sending SCI, before sending SCI by using any selected subchannel set used to send the SCI, padding (padding) is performed on the selected subchannel set. That there is a prerequisite of the sending moment for sending the SCI, or there is a prerequisite of aligning the slot boundary for sending the SCI is understood as: the moment for sending the SCI is located at a start point of a first symbol of the slot, or a start point of an $N^{th}$ symbol (N is greater than or equal to 1 and less than or equal to 14). Padding (padding) is performed by using a sequence (sequence), where the sequence is preamble code (preamble code) or a sounding reference signal (sounding reference signal, SRS). The SCI shown in the paragraph is the first SCI or the second SCI.

In this embodiment of this application, the terminal device 1 and the terminal device 2 senses SCI of a same size. In other words, a payload (payload) of the first SCI sent by the terminal device 1 is the same as a payload of the second SCI sent by the terminal device 2. In addition, fields at a same location of the first SCI and the second SCI have different meanings. This meets a parameter of the terminal device 1 for sending QoS, and meets a parameter of the terminal device 2 for sending CSI. The same payload reduces sensing complexity, and corresponding parameters are met based on parameters of a transmit end and a receive end, to reduce overheads.

Figure 10A:
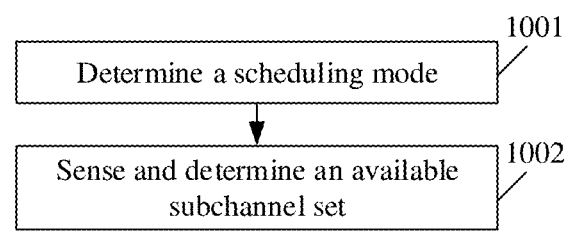
FIG. 10a is a schematic flowchart of an information transmission method according to an embodiment of this application.

FIG. 10*a* is a schematic flowchart of an information transmission method according to an embodiment of this application. The information transmission method is applied to a first terminal device, a second terminal device, and the like. A terminal device that performs the information transmission method is not limited in this embodiment of this application. The following directly uses a terminal device as an example for description. As shown in FIG. 10*a*, the information transmission method includes the following steps.

1001: A terminal device determines a scheduling mode, where the scheduling mode includes a first mode or a second mode.

In this embodiment of this application, the first mode is a network device-based scheduling mode (namely, a mode 1), and the second mode is a contention-based scheduling mode (mode 2). For description of the mode 2, refer to the foregoing embodiments. Details are not described herein again.

Figure 10B:
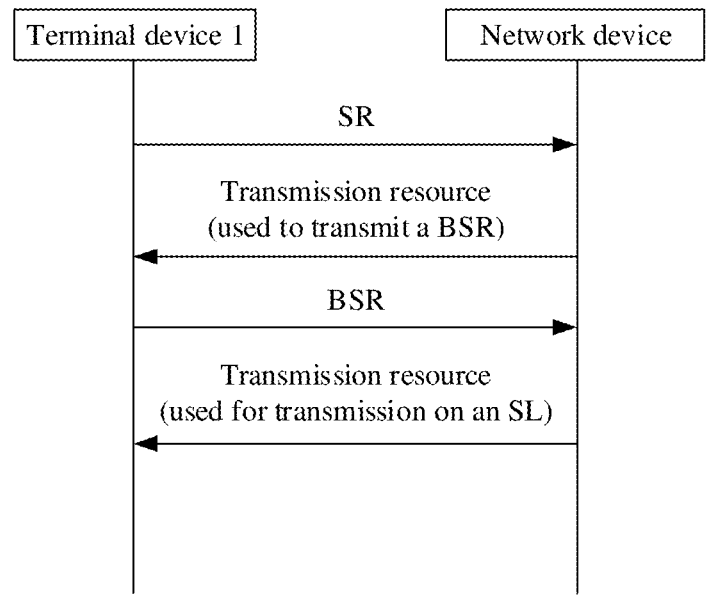
FIG. 10b is a schematic flowchart of a resource scheduling process according to an embodiment of this application.

FIG. 10*b* is a flowchart in which a terminal device 1 interacts with a network device and the terminal device 1 interacts with a terminal device 2 in the mode 1. When the terminal device 1 sends data, the terminal device 1 sends an SR to the network device, and the network device delivers downlink control information (downlink control information, DCI). The DCI is used to indicate a transmission resource used to transmit a buffer state report (buffer state report, BSR) (which further is referred to as a buffer state report) of an amount of to-be-transmitted data on an SL. Then, the terminal device 1 sends the BSR to the network device by using the indicated transmission resource used to transmit the BSR of the amount of the to-be-transmitted data on the SL, and the network device delivers DCI again, where the DCI is used to indicate the transmission resource used to transmit the to-be-transmitted data on the SL. The transmission resource used to transmit the to-be-transmitted data on the SL is usually indicated by using a subchannel, and the transmission resource usually includes at least one of a resource used for a physical sidelink control channel (physical sidelink control channel, PSCCH) and a physical sidelink shared channel (physical sidelink shared channel, PSSCH). Further, the terminal device 1 communicates with the terminal device 2 about control information on the PSCCH, and/or communicate with the terminal device 2 about data information on the PSSCH. The method shown in FIG. 10*b* is an example, and not to be construed as a limitation on this embodiment of this application.

1002: The terminal device senses and determines an available subchannel set.

In this embodiment of this application, for different scheduling modes, the terminal device senses the available subchannel set based on different determining thresholds. For example, the first mode corresponds to a first threshold, the second mode corresponds to a second threshold, and the first threshold is less than the second threshold. That the first mode corresponds to the first threshold is understood as: when performing sidelink data transmission in the first mode, the terminal device senses, based on whether sensed signal energy is less than or equal to the first threshold, whether a subchannel set is available. That the second mode corresponds to the second threshold is understood as: when performing sidelink data transmission in the second mode, the terminal device senses, based on whether sensed signal energy is less than or equal to the second threshold, whether a subchannel set is available.

For example, the terminal device senses, based on signal energy received on a subchannel or signal energy sensed on a subchannel, whether a subchannel is available. For example, when sensing a subchannel 1, the terminal device first interprets, from sensed control information sent by a surrounding terminal device, quality of service (quality of service, QoS) information included in the control information: compare QoS information of to-be-transmitted data of the terminal device and the sensed QoS information of to-be-transmitted data on the subchannel 1: determine the first threshold (or the second threshold) based on the foregoing QoS information; and if signal energy received on the subchannel 1 meets the corresponding threshold, determine that the subchannel 1 is available: otherwise, determine that the subchannel 1 is unavailable. The QoS information included in the control information is QoS information of to-be-sent data of a surrounding terminal device. Meeting the corresponding threshold is understood as that the sensed signal energy is less than or equal to the first threshold (or the second threshold). The sensed signal energy is determined based on any one or more of the RSSI, the RSRP, or the SINR, or is determined based on signal strength of sensed SCI, signal strength of a sensed PSSCH, or the like. This is not limited in this embodiment of this application. The QoS information in this application further is referred to as QoS level information, service priority information, or the like. A name of the QoS information is not limited in this embodiment of this application. The QoS information includes at least one of a ProSe per-packet priority (ProSe per-packet priority, PPPP), N quality indexes (quality index, QI), or another related parameter used to indicate QoS. The first threshold and/or the second threshold is a threshold determined based on QoS information of a sensing terminal device and QoS information of a sensed terminal device, and the threshold is preconfigured, or configured by the network device for the terminal device by using RRC signaling.

After sensing and determining the available subchannel set, the terminal device performs a related operation based on the available subchannel set, for example, reports the available subchannel set to the network device, or notifies another terminal device of the available subchannel set (for example, perform the method shown in FIG. 6). The related operation performed by the terminal device based on the available subchannel set is not limited in this embodiment of this application.

In this embodiment of this application, sensing, in the first mode, is performed by the terminal device, and the terminal device reports the available subchannel set to the network device. Therefore, a prerequisite of an energy threshold of the available subchannel set reported in the first mode is stricter, to ensure that data transmitted by using the reported available subchannel set does not collide. Sensing, in the second mode, is performed by both the terminal device 1 and the terminal device 2. Therefore, an energy threshold of the available subchannel set is larger. This ensures that the terminal device uses the available subchannel set, avoid collision, and improve resource utilization.

Finally, a communication apparatus provided in this embodiment of this application is described in detail.

Figure 11:
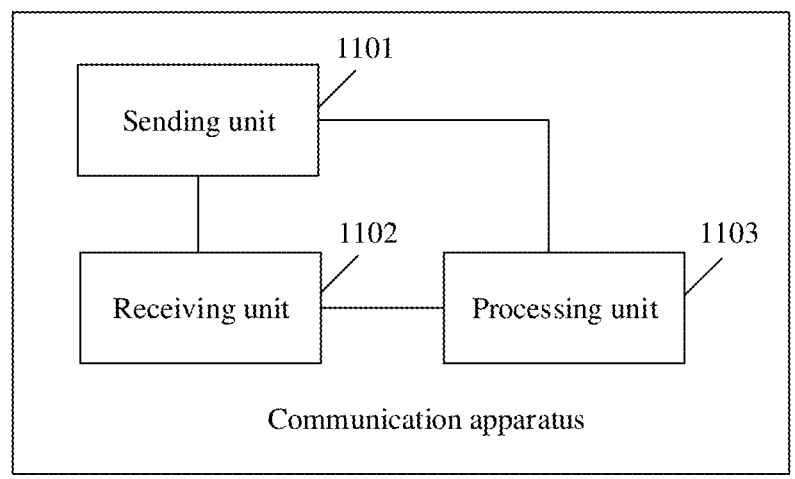
FIG. 11 is a schematic diagram of a structure of a communication apparatus according to an embodiment of this application.

FIG. 11 is a schematic diagram of a structure of a communication apparatus according to an embodiment of this application. The communication apparatus is configured to perform the information transmission method described in embodiments of this application. As shown in FIG. 11, the communication apparatus includes:

a sending unit 1101, configured to send first sidelink control information SCI to a second terminal device, where the first SCI includes information about a first subchannel set, the first subchannel set is an available subchannel set sensed by the first terminal device on a sidelink SL, and the first SCI does not include modulation and coding scheme MCS information.

In a possible implementation, the first SCI includes a first field and a second field: the first field is used to indicate transmit end information of data transmitted on the SL, or the first field is a format identifier of the first SCI; and the second field is used to indicate priority information of the data.

In a possible implementation, the communication apparatus further includes:

a receiving unit 1102, configured to receive second SCI sent by the second terminal device, where the second SCI includes information about a second subchannel set, the second subchannel set is an available subchannel set sensed by the second terminal device on the SL, and the second SCI does not include MCS information.

In a possible implementation, a payload of the second SCI is the same as a payload of the first SCI.

In a possible implementation, the second SCI includes a third field and a fourth field: the third field is used to indicate receive end information of the data transmitted on the SL, or the third field is a format identifier of the second SCI; and the fourth field is used to indicate at least one of channel state information CSI, feedback information, or a reserved bit.

In a possible implementation, a format of the first SCI and a format of the second SCI are configured by using same higher layer signaling.

In a possible implementation, the communication apparatus further includes:

a processing unit 1103, configured to determine a target subchannel set based on the first subchannel set and the second subchannel set.

The sending unit 1101 is further configured to send the data to the second terminal device by using the target subchannel set.

In a possible implementation, the target subchannel set is an intersection between the first subchannel set and the second subchannel set.

In a possible implementation, the sending unit 1101 is further configured to send third SCI to the second terminal device, where the third SCI includes scheduling information of the data transmitted on the SL.

In a possible implementation, the third SCI further includes information used to indicate a feedback subchannel set, and the feedback subchannel set is at least included in the first subchannel set.

Optionally, the communication apparatus shown in FIG. 11 further is configured to perform the following operations.

The processing unit 1103 is configured to determine a scheduling mode, where the scheduling mode includes a first mode or a second mode.

The processing unit 1103 further is configured to: sense an available subchannel set: when the scheduling mode is the first mode, sense the available subchannel set based on a first threshold; and when the scheduling mode is the second mode, sense the available subchannel set based on a second threshold, where the first threshold is less than the second threshold.

In a possible implementation, the first threshold and the second threshold are predetermined, or the first threshold and the second threshold are configured by the network device by using signaling.

In this embodiment of this application, when the communication apparatus is a terminal device or a component that implements the foregoing functions in a terminal device, the processing unit 1103 is one or more processors, the sending unit 1101 is a transmitter, and the receiving unit 1102 is a receiver. Alternatively, the sending unit 1101 and the receiving unit 1102 are integrated into one component, for example, a transceiver. For example, the transceiver sends the first sidelink control information SCI to the second terminal device, and send the data to the second terminal device by using the target subchannel set. For another example, the transceiver receives the second SCI sent by the second terminal device.

When the foregoing communication apparatus is a chip, the processing unit 1103 is one or more processors, the sending unit 1101 is an output interface, and the receiving unit 1102 is an input interface. Alternatively, the sending unit 1101 and the receiving unit 1102 are integrated into one unit, for example, an input/output interface.

For implementation of each unit shown in FIG. 11, refer to corresponding description of the method embodiment shown in FIG. 6, or corresponding description of the method embodiment shown in FIG. 10a.

Figure 12:
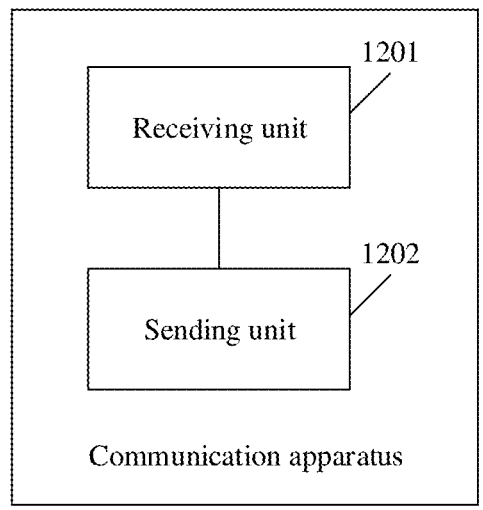
FIG. 12 is a schematic diagram of a structure of a communication apparatus according to an embodiment of this application.

FIG. 12 is a schematic diagram of a structure of a communication apparatus according to an embodiment of this application. The communication apparatus is configured to perform the information transmission method described in embodiments of this application. As shown in FIG. 12, the communication apparatus includes:

a receiving unit 1201, configured to receive first SCI sent by a first terminal device, where the first SCI includes information about a first subchannel set, the first subchannel set is an available subchannel set sensed by the first terminal device on a sidelink SL, and the first SCI does not include modulation and coding scheme MCS information; and a sending unit 1202, configured to send second SCI to the first terminal device, where the second SCI includes information about a second subchannel set, the second subchannel set is an available subchannel set sensed by the second terminal device on the SL, and the second SCI does not include MCS information.

In a possible implementation, the first SCI includes a first field and a second field: the first field is used to indicate transmit end information of data transmitted on the SL, or the first field is a format identifier of the first SCI; and the second field is used to indicate priority information of the data.

In a possible implementation, the second SCI includes a third field and a fourth field: the third field is used to indicate receive end information of the data transmitted on the SL, or the third field is a format identifier of the second SCI; and the fourth field is used to indicate at least one of channel state information CSI, feedback information, or a reserved bit.

In a possible implementation, a payload of the second SCI is the same as a payload of the first SCI.

In a possible implementation, a format of the first SCI and a format of the second SCI are configured by using same higher layer signaling.

In a possible implementation, the receiving unit 1201 is further configured to receive the data sent by the first terminal device by using a target subchannel set, where the target subchannel set is an intersection between the first subchannel set and the second subchannel set.

In a possible implementation, the receiving unit 1201 is further configured to receive third SCI sent by the first terminal device, where the third SCI includes scheduling information of the data transmitted on the SL.

In a possible implementation, the third SCI further includes information used to indicate a feedback subchannel set, and the feedback subchannel set is at least included in the first subchannel set.

In this embodiment of this application, when the communication apparatus is a terminal device or a component that implements the foregoing functions in a terminal device, the sending unit 1202 is a transmitter, and the receiving unit 1201 is a receiver. Alternatively, the sending unit 1202 and the receiving unit 1201 are integrated into one component, for example, a transceiver. For example, the transceiver receives the first SCI sent by the first terminal device, and further sends the second SCI to the first terminal device. The communication apparatus further includes a processor. For example, the processor senses the second subchannel set. This is not limited in this embodiment of this application.

When the foregoing communication apparatus is a chip, the sending unit 1202 is an output interface, and the receiving unit 1201 is an input interface. Alternatively, the sending unit 1202 and the receiving unit 1201 are integrated into one unit, for example, an input/output interface. The communication apparatus further includes a processor.

For implementation of each unit shown in FIG. 12, refer to corresponding description of the method embodiment shown in FIG. 6, or corresponding description of the method embodiment shown in FIG. 10*a*.

Figure 13:
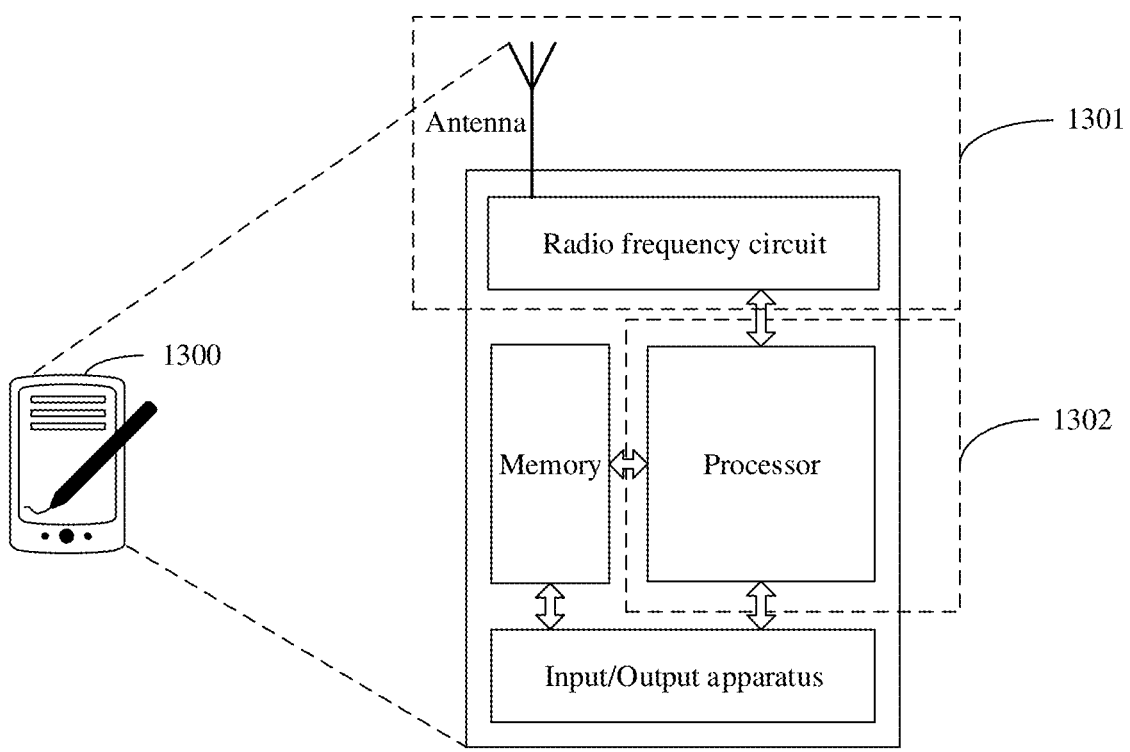
FIG. 13 is a schematic diagram of a structure of a terminal device according to an embodiment of this application.

FIG. 13 is a schematic diagram of a structure of a terminal device 1300 according to an embodiment of this application. The terminal device performs an operation of the first terminal device (the terminal device 1) in the method shown in FIG. 6, or an operation of the communication apparatus shown in FIG. 11. Alternatively, the terminal device is configured to perform an operation of the second terminal device (the terminal device 2) in the method shown in FIG. 6, or an operation of the communication apparatus shown in FIG. 12. The terminal device alternatively is configured to perform the method shown in FIG. 10*a*.

For ease of description, FIG. 13 shows main components of the terminal device. As shown in FIG. 13, the terminal device 1300 includes a processor, a memory, a radio frequency circuit, an antenna, and an input/output apparatus. The processor is mainly configured to: process a communication protocol and communication data, control the entire terminal device, execute a software program, and process data of the software program, for example, support the terminal device in performing the procedure described in FIG. 6 or FIG. 10*a*. The memory is mainly configured to store the software program and the data. The radio frequency circuit is mainly configured to: convert a baseband signal and a radio frequency signal, and process the radio frequency signal. The antenna panel is mainly configured to send and receive a radio frequency signal in an electromagnetic wave form. The terminal device 1300 further includes an input/output apparatus, for example, a touchscreen, a display screen, or a keyboard. The input/output apparatus is mainly configured to: receive data entered by a user, and output data to the user. Some types of terminal devices are free from an input/output apparatus.

After the terminal device is powered on, the processor reads a software program in a storage unit, explain and execute an instruction of the software program, and process data of the software program. When data is sent in a wireless manner, after performing baseband processing on to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art understands that, for ease of description, FIG. 13 shows one memory and one processor. In an actual terminal device, there is a plurality of processors and a plurality of memories. The memory further is referred to as a storage medium, a storage device, or the like. This is not limited in embodiments of this application.

In an optional implementation, the processor includes a baseband processor and a central processing unit (central processing unit, CPU). The baseband processor is mainly configured to process a communication protocol and communication data. The CPU is mainly configured to: control the entire terminal device, execute a software program, and process data of the software program. Optionally, the processor alternatively is a network processor (network processor, NP) or a combination of a CPU and an NP. The processor further includes a hardware chip. The hardware chip is an application-specific integrated circuit (application-specific integrated circuit, ASIC), a programmable logic device (programmable logic device, PLD), or a combination thereof. The PLD is a complex programmable logic device (complex programmable logic device, CPLD), a field-programmable gate array (field-programmable gate array, FPGA), generic array logic (generic array logic, GAL), or any combination thereof. A memory includes a volatile memory or a non-volatile memory, or includes both a volatile memory and a non-volatile memory. The non-volatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM) that is used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

For example, in this embodiment of this application, the antenna and the radio frequency circuit that have receiving and sending functions are considered as a transceiver unit 1301 in the terminal device 1300, and the processor having a processing function is considered as a processing unit 1302 in the terminal device 1300.

As shown in FIG. 13, the terminal device 1300 includes the transceiver unit 1301 and the processing unit 1302. The transceiver unit further is referred to as a transceiver, a transceiver machine, a transceiver apparatus, or the like. Optionally, a component that is in the transceiver unit 1301 and that is configured to implement a receiving function is considered as a receiving unit, and a component that is in the transceiver unit 1301 and that is configured to implement a sending function is considered as a sending unit. In other words, the transceiver unit 1301 includes the receiving unit and the sending unit. For example, the receiving unit further is referred to as a receiver machine, a receiver, a receiver circuit, or the like, and the sending unit is referred to as a transmitter machine, a transmitter, a transmitter circuit, or the like.

In some embodiments, the transceiver unit 1301 and the processing unit 1302 is integrated into one component, or is separated into different components. In addition, the processor and the memory is integrated into one component, or is separated into different components.

The transceiver unit 1301 is configured to perform sending and receiving operations of the terminal device 1 in the foregoing method embodiments, and the processing unit 1302 is configured to perform another operation, other than the sending and receiving operations, of the terminal device 1 in the foregoing method embodiments.

For example, the transceiver unit 1301 is configured to perform the sending and receiving operations in 602, 604, and 606 in FIG. 6, and the processing unit 1302 is configured to perform the operations in 601, 603, and 604 in FIG. 6, and further is configured to perform operations in 1001 and 1002 in FIG. 10a.

For an implementation of the terminal device in this embodiment of this application, refer to the foregoing embodiments. Details are not described herein again.

Figure 14:
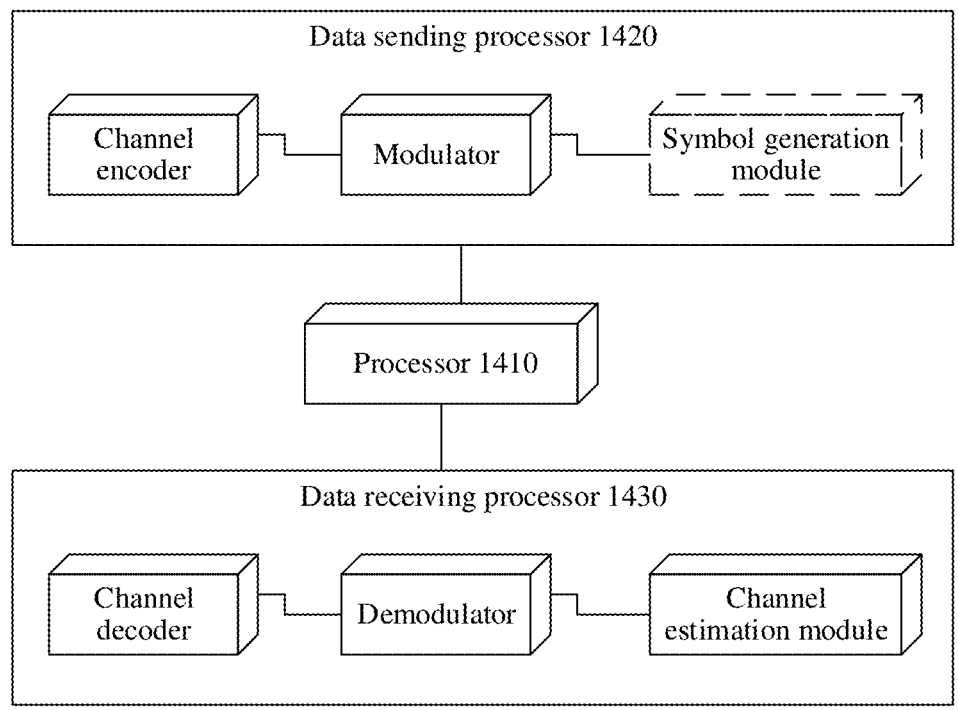
FIG. 14 is a schematic diagram of a structure of a terminal device according to an embodiment of this application.

For the terminal device in this embodiment of this application, refer to a device shown in FIG. 14. In FIG. 14, the terminal device includes a processor 1410, a data sending processor 1420, and a data receiving processor 1430. The processing unit 1103 in the foregoing embodiment is the processor 1410 in FIG. 14, and implements a corresponding function. For another example, the sending unit 1101 in the foregoing embodiment is the data sending processor 1420 in FIG. 14, and the receiving unit 1102 is the data receiving processor 1430 in FIG. 14. Although FIG. 14 shows a channel encoder and a channel decoder, the modules are examples, and do not constitute a limitation on this embodiment.

Figure 15:
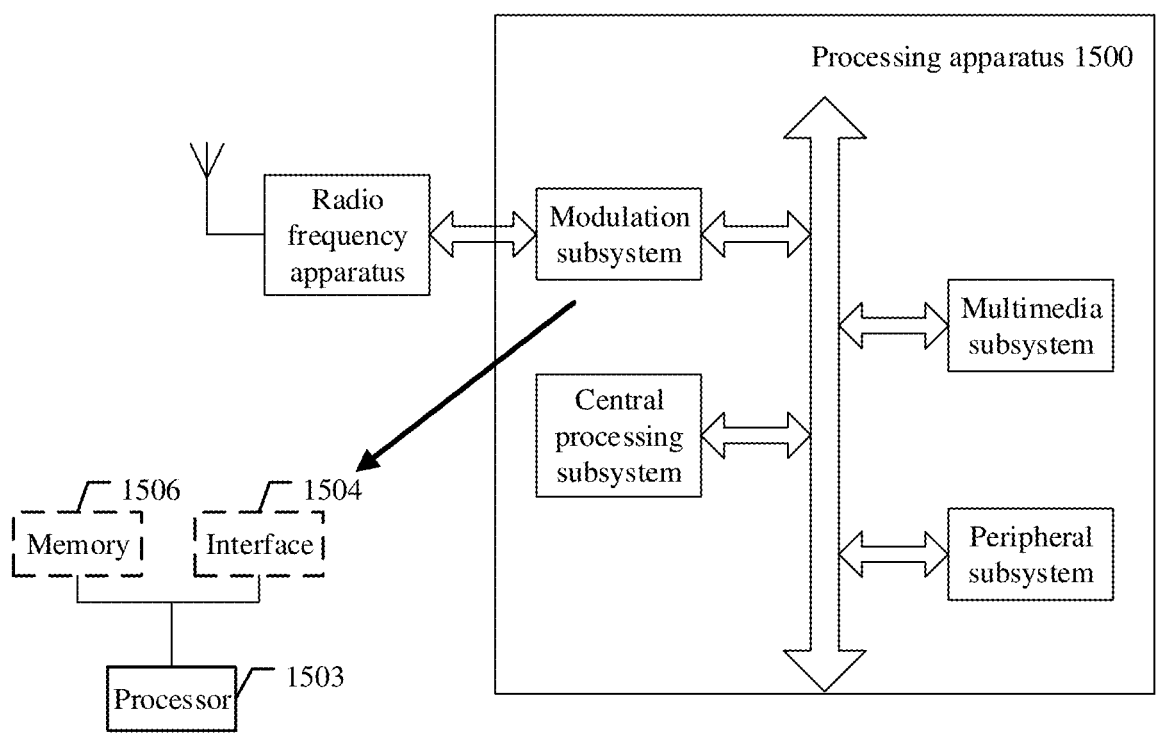
FIG. 15 is a schematic diagram of a structure of a communication apparatus according to an embodiment of this application.

FIG. 15 shows another form of an embodiment of this application. A processing apparatus 1500 includes modules such as a modulation subsystem, a central processing subsystem, and a peripheral subsystem. The communication apparatus in this embodiment of this application is used as the modulation subsystem in the processing apparatus. The modulation subsystem includes a processor 1503 and an interface 1504. The processor 1503 completes a function of the processing unit 1103, and the interface 1504 completes a function of the sending unit 1101 and/or a function of the receiving unit 1102. In another variation, the modulation subsystem includes a memory 1506, a processor 1503, and a program that is stored in the memory 1506 and that is run on the processor. When executing the program, the processor 1503 implements the method of the terminal device 1 in the foregoing method embodiment. The memory 1506 is nonvolatile or volatile. The memory 1506 is located in the modulation subsystem, or is located in the processing apparatus 1500, provided that the memory 1506 is connected to the processor 1503.

An embodiment of this application further provides a computer-readable storage medium, storing instructions. When the instructions are executed, the method of the terminal device 1 in the foregoing method embodiment is performed.

An embodiment of this application further provides a computer program product including instructions. When the instructions are executed, the method of the terminal device 1 in the foregoing method embodiment is performed.

An embodiment of this application further provides a computer-readable storage medium, storing instructions. When the instructions are executed, the method of the terminal device 2 in the foregoing method embodiment is performed.

An embodiment of this application further provides a computer program product including instructions. When the instructions are executed, the method of the terminal device 2 in the foregoing method embodiment is performed.

A person of ordinary skill in the art understands that all or some of the procedures of the methods in the foregoing embodiments is implemented by a computer program indicating related hardware. The program is stored in a computer-readable storage medium. When the program is executed, the procedures of the methods in the foregoing embodiments are performed. The foregoing storage medium includes: any medium that stores program code, such as a ROM or a random access memory (RAM for short), a magnetic disk or an optical disc.

What is claimed is:

1. An information transmission method comprising:
sending first sidelink control information (SCI) to a second terminal device, wherein:
the first SCI comprises information about a first subchannel set;
the first subchannel set is a first available subchannel set sensed by a first terminal device on a sidelink (SL); and
the first SCI is free from modulation and coding scheme (MCS) information; and
receiving second SCI sent by the second terminal device, wherein:
the second SCI comprises:
information about a second subchannel set; and the second subchannel set is a second available subchannel set sensed by the second terminal device on the SL.

2. The method according to claim 1, wherein the first SCI further comprises:
a first field; and
a second field;
wherein the first field is used to indicate transmit end information of data transmitted on the SL, or the first field is a format identifier of the first SCI; and
the second field is used to indicate priority information of the data transmitted on the SL.

3. The method according to claim 1,
wherein the second SCI is free from MCS information.

4. The method according to claim 1, wherein:
the second SCI comprises:
a third field wherein:
the third field is used to indicate receive end information of the data transmitted on the SL; or
the third field is a format identifier of the second SCI; and
a fourth field is used to indicate at least one of channel state information CSI, feedback information, or a reserved bit.

5. The method according to claim 1, further comprising:
determining a target subchannel set based on the first subchannel set and the second subchannel set; and
sending the data transmitted on the SL to the second terminal device by using the target subchannel set.

6. An information transmission method comprising:
receiving first sidelink control information (SCI) sent by a first terminal device wherein the first SCI comprises:
information about a first subchannel set;
the first subchannel set is a first available subchannel set sensed by the first terminal device on a sidelink (SL); and
the first SCI is free from modulation and coding scheme (MCS) information; and
sending second SCI to the first terminal device, wherein the second SCI comprises:
information about a second subchannel set;
the second subchannel set is a second available subchannel set sensed by the second terminal device on the SL; and
the second SCI is free from MCS information.

7. The method according to claim 6, wherein the first SCI further comprises:
a first field; and
a second field;
wherein the first field is used to indicate transmit end information of data transmitted on the SL, or the first field is a format identifier of the first SCI; and
the second field is used to indicate priority information of the data transmitted on the SL.

8. The method according to claim 7, wherein the second SCI further comprises:
a third field; and
a fourth field;
wherein the third field is used to indicate receive end information of the data transmitted on the SL, or the third field is a format identifier of the second SCI; and
the fourth field is used to indicate at least one of channel state information CSI, feedback information, or a reserved bit.

9. The method according to claim 7, further comprising:
receiving the data transmitted on the SL sent by the first terminal device by using a target subchannel set, wherein the target subchannel set is an intersection between the first subchannel set and the second subchannel set.

10. The method according to claim 7, further comprising:
receiving third SCI sent by the first terminal device, wherein the third SCI comprises scheduling information of the data transmitted on the SL.

11. A communication apparatus comprises:
a processor;
a memory, wherein the memory stores a computer program for execution by the processor to perform operations comprising:
sending first sidelink control information (SCI) to a second terminal device, wherein the first SCI comprises:
information about a first subchannel set;
the first subchannel set is a first available subchannel set sensed by the processor on a sidelink SL; and
the first SCI is free from modulation and coding scheme (MCS) information; and
receiving second SCI sent by the second terminal device, wherein the second SCI comprises:
information about a second subchannel set; and
the second subchannel set is a second available subchannel set sensed by the second terminal device on the SL.

12. The communication apparatus according to claim 11, wherein the first SCI further comprises:
a first field; and
a second field;
wherein the first field is used to indicate transmit end information of data transmitted on the SL, or the first field is a format identifier of the first SCI; and
the second field is used to indicate priority information of the data transmitted on the SL.

13. The communication apparatus according to claim 11, wherein
the second SCI is free from MCS information.

14. The communication apparatus according to claim 11, wherein the second SCI comprises:
a third field; and
a fourth field;
wherein the third field is used to indicate receive end information of the data transmitted on the SL; or
the third field is a format identifier of the second SCI; and
the fourth field is used to indicate at least one of channel state information CSI, feedback information, or a reserved bit.

15. The communication apparatus according to claim 11, wherein the processor further performs operations further comprising:
determining a target subchannel set based on the first subchannel set and the second subchannel set, and
sending the data transmitted on the SL to the second terminal device by using the target subchannel set.

16. A communication apparatus comprises:
a processor;
a memory, wherein the memory stores a computer program for execution by the processor to perform operations comprising:
receiving first SCI from a first terminal device, wherein the first SCI comprises:
information about a first subchannel set;
the first subchannel set is a first available subchannel set sensed by the first terminal device on a sidelink (SL); and the first SCI is free from modulation and coding scheme (MCS) information; and sending second SCI to the first terminal device, wherein the second SCI comprises:

information about a second subchannel set;

the second subchannel set is a second available subchannel set sensed by the processor on the SL; and the second SCI is free from MCS information.

17. The communication apparatus according to claim 16, wherein the first SCI further comprises:

a first field; and a second field;

wherein the first field is used to indicate transmit end information of data transmitted on the SL, or the first field is a format identifier of the first SCI; and the second field is used to indicate priority information of the data transmitted on the SL.

18. The communication apparatus according to claim 17, wherein the second SCI further comprises:

a third field; and a fourth field;

wherein the third field is used to indicate receive end information of the data transmitted on the SL, or the third field is a format identifier of the second SCI; and the fourth field is used to indicate at least one of channel state information CSI, feedback information, or a reserved bit.

19. The communication apparatus according to claim 17, wherein the processor further performs operations further comprising:

receiving the data transmitted on the SL from the first terminal device by using a target subchannel set, wherein the target subchannel set is an intersection between the first subchannel set and the second subchannel set.

20. The communication apparatus according to claim 17, wherein the processor further performs operations further comprising:

receiving third SCI from the first terminal device, wherein the third SCI comprises scheduling information of the data transmitted on the SL.

\* \* \* \* \*